Nov. 15, 1966     R. T. SILENIUS ETAL     3,285,655
BABY CAR SEAT
Filed Dec. 14, 1964     3 Sheets-Sheet 1
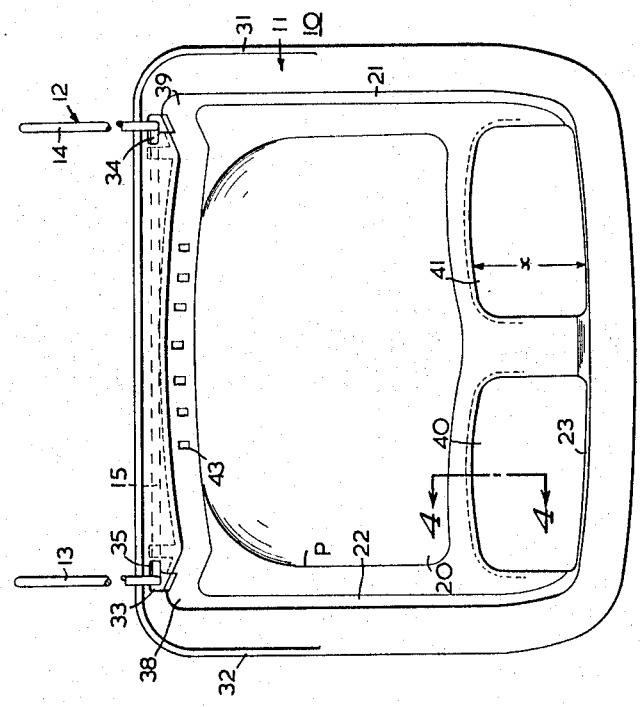
INVENTORS
ROBERT T. SILENIUS
EDWIN W. BINKLEY
ANDREW G. BAIRD Nov. 15, 1966   R. T. SILENIUS ETAL   3,285,655
BABY CAR SEAT
Filed Dec. 14, 1964   3 Sheets-Sheet 2
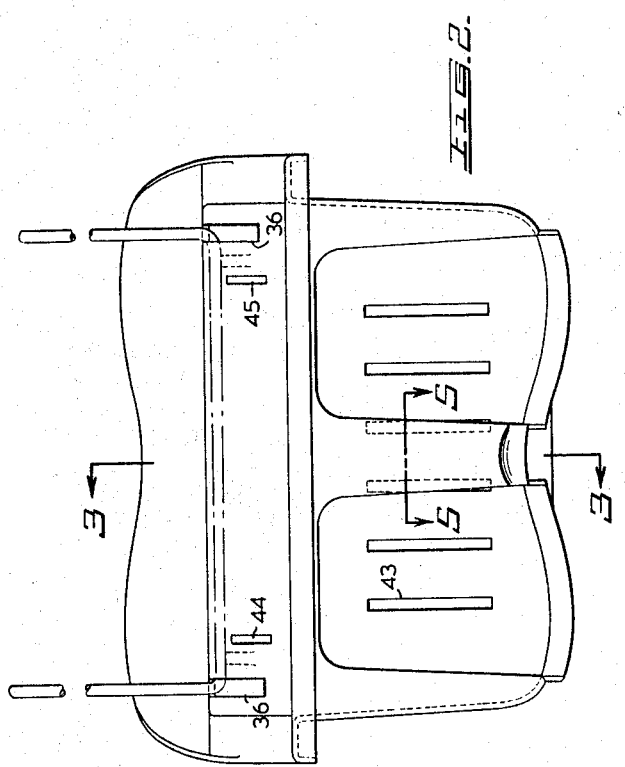
INVENTORS
ROBERT T. SILENIUS
EDWIN W. BINKLEY
ANDREW G. BAIRD

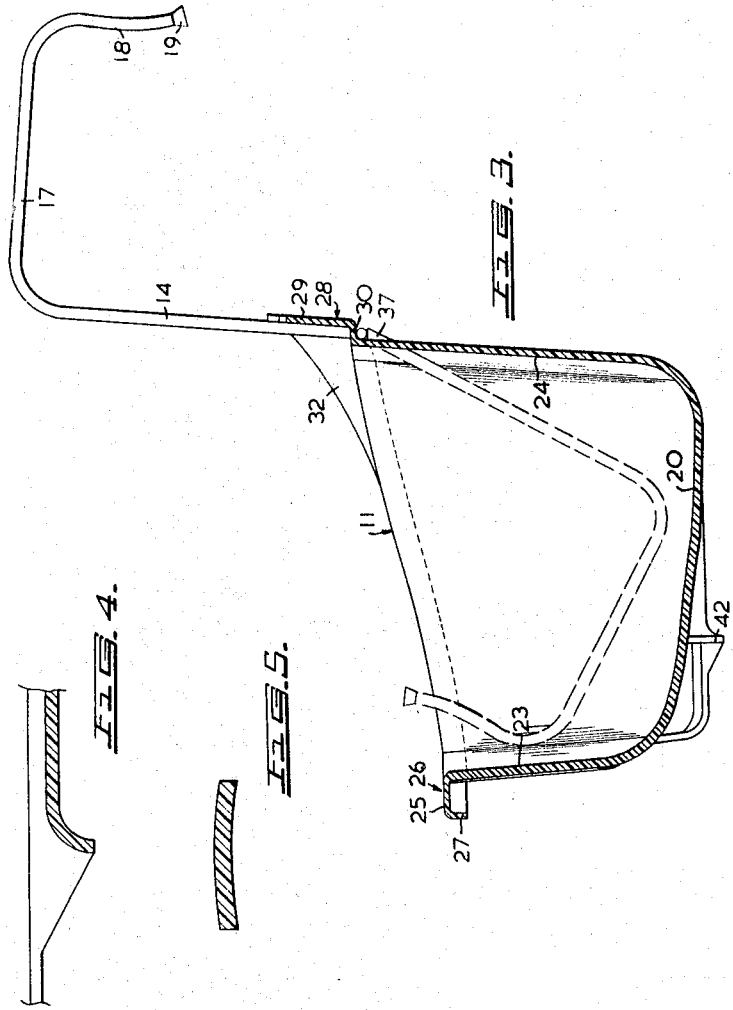

3,285,655

BABY CAR SEAT

Robert T. Silenius, Toronto, Ontario, Edwin W. Binkley, Georgetown, Ontario, and Andrew G. Baird, Brampton, Ontario, Canada, assignors to Smith & Stone Limited, Toronto, Ontario, Canada
Filed Dec. 14, 1964, Ser. No. 418,143
Claims priority, application Canada, June 2, 1964, 904,208
12 Claims. (Cl. 297—254)

This invention relates to a transportable child's supporting seat demountably securable to a support and hereinafter will be termed a baby seat.

The invention is particularly concerned with a baby seat for use in automobiles wherein said baby seat consists of a molded body portion and a pair of body supporting hangers pivotally secured thereto.

There are numerous known devices for the same purpose. However, in most instances they are composed of a number of different parts and are thus difficult to assemble. Also in most instances they are collapsible and accordingly provide no protection whatsoever for the occupant in the event of accident. The multi-part and collapsibility of the known devices also renders them highly subjective to damage in normal usage. Since a baby seat is frequently in and out of use, they further are highly subjective to damage. Frequently, the seat is transferred to the trunk of the car and there too it is subjected to rough treatment. It is also obvious that multipart devices cause excessive wear due to the relative movement of one part with respect to another.

Storage, shipping and assembly of the multi-part known devices also presents many problems.

It is an object of the present invention to provide a relatively strong baby seat which will afford protection to the occupant in the event of accident.

It is a further object of the invention to provide a baby seat devoid of sharp corners which otherwise, in the event of an accident, may injure the occupant.

It is also a further object of this invention to provide a molded one-piece baby seat which is relatively durable and inexpensive to produce.

A still further object is to provide a baby seat capable of being shipped, and stored in a preassembled condition.

The invention is illustrated by way of example in the accompanying drawings wherein:

FIGURE 1 is a top plan view of a baby seat constructed in accordance with the present invention;

FIGURE 2 is a front elevational view of FIGURE 1;

FIGURE 3 is a cross-sectional view along section 3—3 of FIGURE 2, and including the hanger assembly;

FIGURE 4 is a cross-sectional view along section 4—4 of FIGURE 1; and

FIGURE 5 is a cross-sectional view along section 5—5 of FIGURE 2.

Referring now in detail to the drawings, shown therein is a baby seat 10 consisting of a molded body 11 and a hanger assembly 12. The hanger assembly consists of a pair of arms 13 and 14 interconnected by a rod 15 formed integral therewith. Each of the arms terminates in a terminally turned down hook portion consisting of a substantially first straight portion 17 and a second or further portion 18. Plastic tips 19 or other suitable protective means may be secured to the ends of the arms.

The body portion 11 is a unitary structure molded of polyethylene, polypropylene or the like resin, and includes a seat portion 20, upwardly projecting opposed side walls 21 and 22, a front wall 23, and a rear wall 24. The side walls 21 and 22 and the front wall 23 each terminate at their upper edge in a reinforcing rib 25. The rib consists of an outardly directed flange 26 and a terminally turned down flange 27.

The rear wall 24 has a rearwardly offset portion 28, adjacent its upper edge, which consists of an upwardly projecting flange 29 and a lateral flange 30. The flange 29 merges into the rib 25 of the respective side walls 21 and 22 by reinforcing gussets 31 and 32 and the flange 30 forms an abutment for the rod 15 connecting the arms, as will be seen hereinafter.

There are a pair of spaced apertures 33 and 34 in the body 11 through which respective legs 13 and 14 project. Each of the apertures 33 and 34 includes a substantially rectangular portion 35 disposed within the flange 30 and a rectangular portion 36, which extends downwardly along the rear wall 24. It will now be apparent that the portion 36 permits the hanger assembly to be pivoted about the rod portion 15 to assume an inoperative position illustrated in phantom in FIGURE 3 wherein the arms 13 and 14 are disposed substantially within the body portion 11. The portion 35 of the aperture permits the arms 13 and 14 to merge into the arm 15 in a gentle curve (of relatively small radius) without fear of causing an undue stress in the flange 30 adjacent the apertures when the body is suspended by means of the hanger assembly.

Not only does the offset portion provide a flange which bears against a portion of the arms to support the body in a selected position but also such offset portion facilitates the simultaneous formation of the apertures with the molding operation and yet not hamper the stripping of the molded article.

The rear wall includes rearwardly directed ribs 37 formed on the outer surface thereof. The upper edge of such ribs terminates adjacent the lower edge of rod 15 and thus serves to prevent downward sliding movement of the hanger assembly. These ribs, if desired, may also be extended to provide reinforcement for the rear wall and/or an abutment to bear against the supporting structure (not shown). The rearwardly offset portion of the rear wall provides reinforcement for such wall while at the same time providing a ledge upon which the arms 13 and 14 bear for supporting the body of the seat at a desired position while suspended from a suitable supporting structure.

In plan view, it will also be noted that the rear wall is slightly concave so as to provide a certain amount of comfort for the occupant. The extreme edge portions of the rear wall are reversely bent to form corner channels 38 and 39 which effectively define edge reinforcing vertical columns.

The front wall includes a pair of apertures 40 and 41 through which the occupant's legs may project. These apertures extend downwardly and terminate in the bottom wall at a selected distance from the plane of the front wall. This distance, illustrated as "X" in FIGURE 1 is somewhat critical from a point of view of ease of removal of the occupant from the seat. A distance of approximately 2½ inches has been found suitable. If the distance is too great, there is insufficient seat area for comfort to the occupant while if too small there is a binding action of the occupant's legs in the apertures hampering removal of the occupant. In order to prevent cutting or pinching of the occupant's legs, and also to add strength to the bottom wall, the latter has a downwardly turned reinforcing flange 42.

In order to secure the seat rigidly in an automobile, there is provided in the rear wall 24 a plurality of vertically extending elongated slots 43 disposed substantially parallel at horizontally spaced intervals. These slots are of sufficient size to permit threading therethrough one strap of a pair forming an ordinary automobile safety seat belt. While only two slots are required for such threading, there are additional ones provided to compensate for the variance in seat dimensions and belts of various car manufacturers. It is desirable that the belt buckle be disposed at one side or the other of the baby seat to facilitate fastening the same.

The rear wall is further provided with a pair of spaced slots 44 and 45 adjacent its upper edge. These slots provide either for the threading therethrough or securement of a pair of straps of a belt to circumscribe and thereby secure the occupant firmly in the seat. Other means, such as hooks or the like, if desired, may be provided for securing a pair of straps to the back 24.

It is obvious that the side walls may also, if desired, be provided with ventilating slots. Care in this, however, should be taken so as not to provide slots of such size as to catch a child's fingers. This would be dangerous in the event of accident.

In order to modify what would otherwise be a slippery surface on the seat portion, the surface is embossed in a suitable pattern in roughly the area outline by line P in FIGURE 1.

In the described embodiment of the invention, the hanger assembly is shown, such that the arms are confined within the body 11 when in an inoperative position. This facilitates packing and shipping of the device. It is also conceivable that the same arms could be disposed such that they are disposed immediately adjacent the exterior surface of the side walls when the arms are in an inoperative position. This, however, would require a modification to the rim 25 above the side walls so as not to interfere with the pivotal movement of the arms.

From the foregoing it is obvious that the occupant of the seat is well secured and protected in the event of an automobile accident. The molded plastic body further effects such protection and in regard to this, the material used preferably should not be brittle nor be of the type which could shatter.

We claim:

1. A baby seat comprising:
(a) a molded body member having a bottom, side, front and rear walls, a pair of apertures in said front walls for the legs of an occupant of the seat, said rear wall having an offset portion and a pair of apertures disposed therein, and
(b) a hanger assembly pivotally secured to said rear wall, said hanger assembly including a pair of spaced, substantially parallel arms each terminating at one end in a hook portion and being interconnected at the other end by a common bar, said common bar bearing against the offset portion of the rear wall and having the arms projecting upwardly away from the body through respective ones of the pair of apertures in an operative position.

2. A baby seat as defined in claim 1 including slots in said rear wall communicating with said apertures and directed downwardly in a direction toward said bottom wall whereby the arms are pivotable to an inoperative position.

3. A baby seat as defined in claim 1 wherein the offset portion includes a lateral flange and a further flange projecting upwardly therefrom away from said body to provide a stop member for said arms.

4. A baby seat as defined in claim 1 including a reinforcing rib extending outwardly around said body adjacent the free edge of the side and front walls.

5. A baby seat as defined in claim 4 wherein said reinforcing rib is substantially L-shaped in cross-section which together with the adjacent body wall provides a U-shaped reinforcing channel.

6. A baby seat comprising:
(a) a body member molded of rigid plastic material and including integrally formed side, bottom, rear and front walls, said front wall having an opening therethrough which extends rearwardly a selected distance into said bottom wall for the legs of an occupant; and,
(b) a hanger assembly pivotally secured to said rear wall, said rear wall having a pair of apertures disposed therein, said hanger assembly including a pair of spaced, substantially parallel arms each terminating at one end in a hook portion and being interconnected at the other end by a common bar, said common bar being pivotally secured to said rear wall and having the arms projecting upwardly away from the body through respective ones of the pair of apertures in an operative position.

7. A baby seat as defined in claim 1 including a plurality of vertically extending slots disposed in horizontally spaced relationship in the rear wall.

8. A baby seat as defined in claim 1 wherein said apertures in the front wall extend rearwardly into the bottom wall a selected distance from the former.

9. A baby seat comprising:
(a) a molded plastic body member having integrally formed bottom, side, front and rear walls each terminating in a free upper edge having a reinforcing rib adjacent thereto including a flange disposed normal to and projecting laterally from the respective walls, said front wall having a pair of apertures extending from the rib associated therewith to the bottom wall and into the bottom wall terminating therein in a rib directed outwardly from the body a selected distance from the front wall and substantially partllel thereto, said apertures receiving the legs of an occupant of the seat, the rib adjacent the rear wall having a flange projecting upwardly therefrom and laterally offset outwardly with respect to the body, and a pair of apertures disposed in said rib in spaced relation and extending into said rear wall, and
(b) a hanger assembly pivotally secured to said body to suspend the latter from a substantially vertical support, said assembly comprising a pair of spaced arms terminating at one end in a hook portion and disposed in a pair of spaced substantially parallel planes and interconnected at the opposed end by a common bar, said arms projecting through the apertures in the rib of said rear wall and having the rod abutting such rib thereby pivotally securing said assembly to said body, said arms being pivotable to an inoperative position wherein they are disposed substantially within said body and an operative position wherein they project upwardly therefrom, said upwardly projecting flange on the rib adjacent the rear wall forming an abutment for said arms in the latter position to support the body with the seat substantially horizontal when said arms are vertical with the hook portion directed rearwardly in a direction opposite to that of the body, said rear wall further including an abutment in spaced relation with respect to the rib engaging the rod on the opposite side thereof and thereby prevent removal of said assembly from said body while the former is in its operative position.

10. A baby seat as defined in claim 9 including a plurality of apertures in the rear wall thereof, selected pairs thereof having a belt threaded therethrough to anchor the seat to that of an automobile and a further selected pair having a belt threaded therethrough to anchor the occupant to the body of the baby seat.

11. A structure including means for mounting the same comprising in combination a rigid body having at least one rigid sheet-like member terminating adjacent one edge in an offset portion; a pair of apertures extending through said offset portion adjacent the transition of said sheet member wherein the offset occurs; a hanger assembly consisting of a pair of hooked arms projecting through respective ones of said apertures and a cross member interconnecting said arms, said cross member bearing against a laterally extending flange at said transition providing the offset and thereby providing means for suspending said body by said hanger members; said rigid sheet-like member having slots extending into said apertures and thereby providing means, whereby the hanger is pivotally movable between an operative position wherein the arms project outwardly from the rigid sheet-like member and an inoperative position, wherein said arms are disposed within an outline area defined by said body.

12. A structure as defined in claim 11, wherein said arms in an operative position extend from the cross member outwardly from the body in a plane, intermediate a pair of planes defined by the offset portions of the sheet-like member.

References Cited by the Examiner

UNITED STATES PATENTS

| | | | |
|---|---|---|---|
| Re. 25,710 | 1/1965 | Ouellette | 297—457 |
| 472,351 | 4/1892 | Higham | 297—277 |
| 839,944 | 1/1907 | Martin | 297—254 |
| 1,335,776 | 4/1920 | Young | 297—254 |
| 1,351,746 | 9/1920 | Eberle | 5—94 |
| 1,584,161 | 5/1926 | Bear | 297—254 |
| 2,008,689 | 7/1935 | Donahoe | 297—255 |
| 2,803,468 | 8/1957 | Thompson | 297—254 |
| 2,957,184 | 10/1960 | Smith | 4—185 |
| 2,969,830 | 1/1961 | Thompson | 297—130 |
| 3,065,028 | 11/1962 | Irion | 297—254 |
| 3,083,997 | 4/1963 | Chreist | 297 254 |
| 3,132,895 | 5/1964 | Pollington | 297—258 |
| 3,142,512 | 7/1964 | Hamilton | 297—320 |
| 3,155,425 | 11/1964 | Chreist | 297—254 |

FRANK B. SHERRY, *Primary Examiner.*

FRANCIS K. ZUGEL, *Examiner.*